United States Patent [19]

Ohki et al.

[11] Patent Number: 4,587,889
[45] Date of Patent: May 13, 1986

[54] POWER-SERVO BOOSTER

[75] Inventors: Junichi Ohki; Yuzoh Gotoh; Takanao Kamei, all of Higashimatsuyama, Japan

[73] Assignee: Jidosha Kiki Co., Ltd., Tokyo, Japan

[21] Appl. No.: 600,202

[22] Filed: Apr. 13, 1984

Related U.S. Application Data

[63] Continuation of Ser. No. 337,913, Jan. 8, 1982, abandoned.

[30] Foreign Application Priority Data

Jan. 28, 1981 [JP] Japan .................. 56-10454[U]

[51] Int. Cl.$^4$ .................................. F01B 19/00
[52] U.S. Cl. .................................. 92/98 D; 92/99
[58] Field of Search ............. 92/98 D, 99, 100, 103 R

[56] References Cited

U.S. PATENT DOCUMENTS

| | | | |
|---|---|---|---|
| 2,904,068 | 9/1959 | St. Clair | 92/99 |
| 3,081,063 | 3/1963 | Seltsam | 92/99 |
| 3,405,609 | 10/1968 | Lee | 92/99 |
| 3,754,450 | 8/1973 | Putt | 92/99 |
| 3,777,777 | 12/1973 | Katchka | 92/99 |
| 3,824,903 | 7/1974 | Hahn | 92/99 |
| 3,847,513 | 11/1974 | Foster | 92/98 D |
| 3,851,565 | 12/1974 | Camm | 92/99 |
| 3,911,796 | 10/1975 | Hull | 92/99 |
| 3,974,849 | 8/1976 | Dawson | 92/98 D |
| 4,296,680 | 10/1981 | Ohta | 92/98 D |
| 4,325,218 | 4/1982 | Weiler | 92/98 D |

FOREIGN PATENT DOCUMENTS 2044376 10/1980 United Kingdom .

Primary Examiner—Abraham Hershkovitz
Attorney, Agent, or Firm—Sughrue, Mion, Zinn, Macpeak, and Seas

[57] ABSTRACT

A power servo booster having front and rear shells coupled together to reciprocally provide a power piston therein. A flexible diaphragm has an inner peripheral surface secured to the power piston and an outer peripheral surface secured to the coupling portion between the front and rear shells. The diaphragm divides the shell into negative pressure chamber and an atmospheric pressure chamber. A portion of the diaphragm confronts the rear face of the power piston and extends therefrom toward the front shell and then is folded back to provide a folded portion defined from outer end portion of the power piston. The folded portion is continuous to a contacting portion of the diaphragm which contacts inner wall of the shell. At least one of the contacting portion and the portion contacting the outer end of the power piston provides a thick wall portion as an high rigidity member.

6 Claims, 7 Drawing Figures

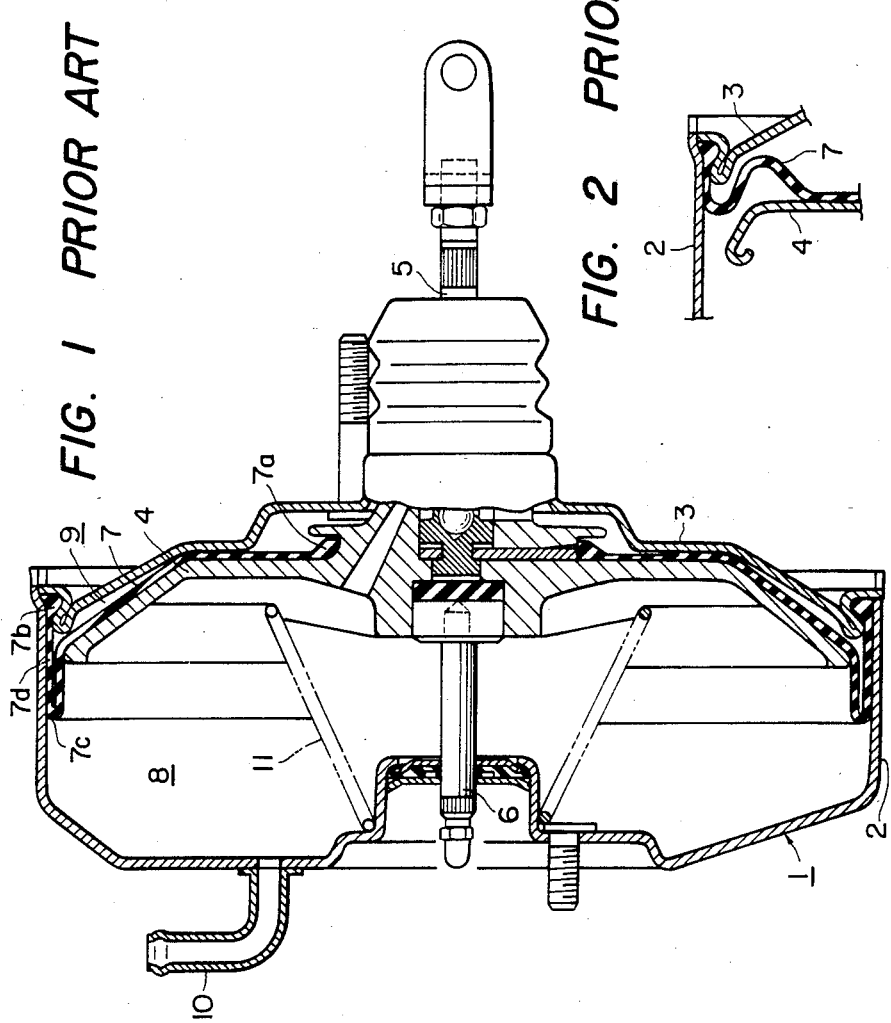

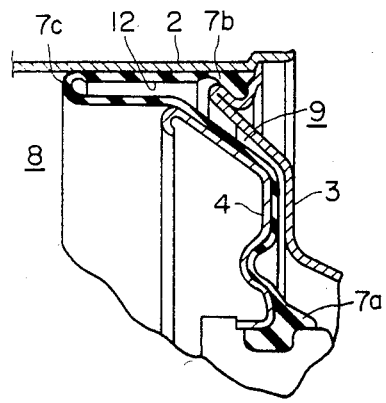
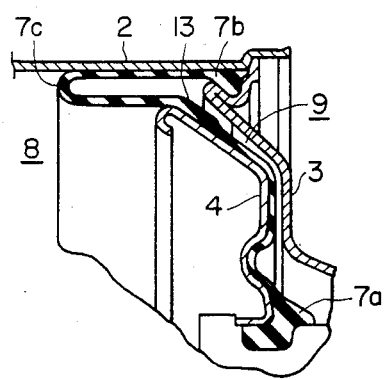
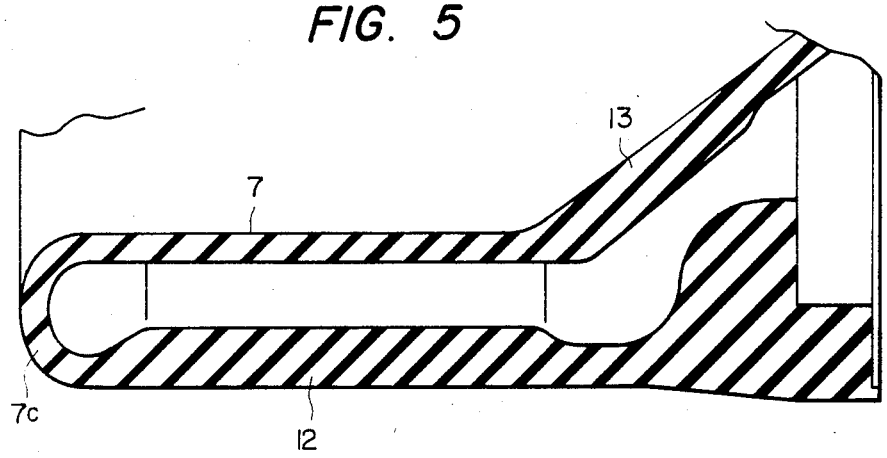

POWER-SERVO BOOSTER

This application is a continuation of application Ser. No. 337,913, filed Jan. 8, 1982, now abandoned.

BACKGROUND OF THE INVENTION

The present invention relates to a power-servo booster, and more particularly, to a type thereof capable of providing urging force to a power piston which secures a diaphragm positioned within a shell by applying pressure differential to the diaphragm.

A conventional power servo booster of this type is shown in FIG. 1, wherein a shell 1 includes a front shell 2 and a rear shell 3 coupled to the front shell at its rear end. Within the shell 1, a power piston 4 is reciprocally provided, and an input shaft 5 and an output shaft 6 are connected to the power piston 4. A flexible diaphragm 7 has an inner peripheral surface 7a supported to the power piston 4 and an outer surface 7b secured to the coupling portion between the front and rear shells. The diaphragm 7 divides the interior space of the shell 1 into a negative pressure chamber 8 and an atmospheric pressure chamber 9. The negative pressure chamber 8 is communicated with a pipe 10 adapted to introduce negative pressure into the chamber 8.

According to the conventional power servo booster, thus constructed, during the non-operating state wherein negative pressure is introduced into the chamber 8 through the pipe 10 and no input is applied to the input shaft 5, the negative pressure is also introduced into the atmospheric pressure chamber 9 through a valve means (not shown) in the power piston 4, so that the power piston 4 is positioned close to the rear shell 3, as shown, by the biasing force of a restoration spring 11 positioned between the front shell 2 and the power piston 4. In this case, as shown in FIG. 1, the diaphragm 7 provides a folded portion 7c and a contacting portion 7d. The folded portion 7c extends from the outer peripheral end surface of the power piston 4 toward a front portion of the shell 1 (leftwardly in the drawing), and the contacting portion 7d contacts the inner surface of the shell 1 at the diaphragm portion between the folded portion 7c and the outer end 7b of the diaphragm. Maintaining this state, an input is applied to input shaft 5 by moving the same toward the front shell 2, fluid communication between the negative pressure chamber 8 and the atmospheric pressure chamber 9 is blocked by valve means, and simultaneously, atmospheric pressure is introduced into the atmospheric pressure chamber 9. As a result, pressure difference is provided between these chambers 8 and 9, to thereby provide urging force to the power piston 4, whereby the output shaft 6 is moved frontwardly with the aid of the pressure differential.

During air discharge working within a brake piping, after installation of such booster into an engine compartment of a vehicle, in case the input shaft 5 is immediately operated without the introduction of the negative pressure into the negative pressure chamber, a portion of the diaphragm 7 confronting the face (disc portion) of the power piston 4 may be spaced apart therefrom due to the inner pressure increase of the negative pressure chamber 8 upon frontward movement of the power piston 4. The diaphragm 7 may be arcuately deformed or curved rearwardly as shown in FIG. 2. Then if the power piston 4 is immediately shifted to its restoring position as shown in FIG. 1, the deformed portion of the diaphragm 7 adjacent to the rear face of the power piston may be folded or enrolled at the rear face of the power piston. As a result of this phenomenon, the output shaft 6 of the power piston 4 cannot be completely moved back to its original position. Since one end of the output shaft 6 is connected to a piston of a master cylinder (not shown), the piston of the master cylinder remains in its extended position and therefore sufficient air discharge is not completely attainable. The above-mentioned drawback (dashpot phenomena) is also described in detail in the commonly assigned U.S. Pat. No. 4,292,887.

SUMMARY OF THE INVENTION

It is therefore an object of the present invention to overcome the above-mentioned drawbacks and to provide an improved brake power servo booster.

Another object of the invention is to provide such booster capable of preventing the diaphragm from being folded or enrolled at a position adjacent to the rear face of the power piston.

These and other objects of the invention are attained by providing a diaphragm having a thick portion at least at one of the portion in contact with the inner surface of the shell and a portion in contact with the outer peripheral end portion of the power piston.

BRIEF DESCRIPTION OF THE DRAWINGS

In the drawings:

FIG. 1 is a vertical cross-sectional view showing a conventional power servo booster;

FIG. 2 is an explanatory view showing entrolling deformation of a folded portion of the diaphragm;

FIG. 3 is a cross-sectional view showing an essential portion according to a first embodiment of the present invention;

FIG. 4 is a cross-sectional view showing an essential portion according to a second embodiment of the present invention;

FIG. 5 is a partially enlarged cross-sectional view showing a diaphragm as a result of combination of the first and the second embodiments of the present invention and FIGS. 6 and 7 are partial isometric views of modifications of the embodiments of FIGS. 3 and 4 having thick wall portions formed intermittently.

DETAILED DESCRIPTION OF THE PREFERRED EMBODIMENTS

Figure 6:
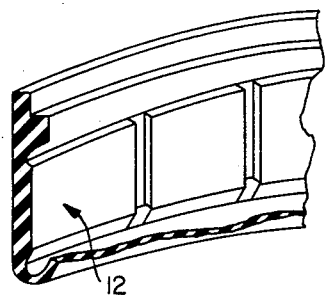

A first embodiment of the present invention is shown in FIG. 3, wherein a diaphragm 7 includes a thickened wall portion 12 at its portion contacting with an inner surface of a front shell 2. The thick wall portion 12 provides a higher rigidity than that of the remaining portion of the diaphragm such as the folded portion 7c and the portion contacting the rear face of a power piston 4. The thick wall portion 12 extends along and contacts the inner surface of the front shell 2 and provides high resistivity against bending deformation due to external force.

With this structure, during air-discharge work, even if the negative pressure is not introduced into the negative pressure chamber 8 and the power piston is moved frontwardly, the diaphragm 7 maintains its contacting state with the inner surface of the shell 2 against the inner pressure increase of the negative pressure chamber 8 because of the high rigidity of the thick wall portion 12. Further, even if the thick wall portion 12 is deformed or bent, the above-mentioned disadvantageous enrolling or folding phenomena does not occur since the thick wall portion 12 provides sufficient biasing force to restore its original shape.

According to this embodiment, since the thick wall portion 12 maintains the contacting state with the shell 2, it is possible to prevent the folded portion 7c of the diaphragm 7 from being hung or bulged during frontward movement of the power piston 4. Accordingly, during operation, the diaphragm does not affect the effective diameter of the power piston, to thus provide stabilized brake performance with high output.

A second embodiment of the invention is shown in FIG. 4, wherein diaphragm 7 includes a thickened wall portion 13 at a portion in contact with a rear face of the power piston 4. In this embodiment, similar to the first embodiment, since the thick wall portion 13 provides a higher rigidity than that of the remaining portion thereof, even if bending deformation occurs during frontward movement of the piston, the thick wall portion provides sufficient resistivity against external force to thereby prevent the diaphragm from being folded or enrolled at the position confronting the rear face of the power piston.

Further, FIG. 5 shows a diaphragm provided by the combination of the first and the second embodiments. Apparently, more preferable effect is obtainable in the modified embodiment.

Figure 7:
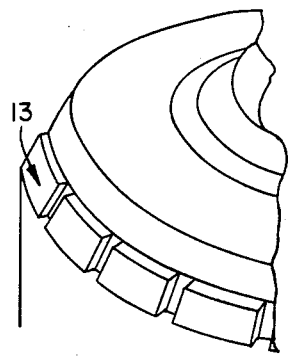

In the foregoing embodiments, the thick wall portions 12 and 13 provide rectangular shape cross-sections. These thick wall portions are of annular shape having a center axis coincident with the axis of the diaphragm. However, as modifications, it is possible to provide the thick wall portion having a trapezoidal cross section in which the rear portion thereof is thicker than the front portion. Alternatively, instead of annular shape, the thick wall portions can be formed intermittently along circumferential direction of the corresponding portion of the diaphragm. Such are illustrated in FIGS. 6 and 7 relative to the first and second embodiments.

Furthermore, the teaching derived from the present invention is applicable to a clutch power servo booster as well as the brake power servo booster.

In view of the foregoing, according to the present invention, enrolling or folding phenomena of the diaphragm at the position confronting the rear face of the power piston can be eliminated. Accordingly, the booster provides high brake performance and prolonged durability.

While the invention has been described in detail and with reference to specific embodiments thereof, it will be apparent for those skilled in the art that various changes and modifications can be made therein without departing from the spirit and scope of the invention.

What is claimed is:

1. In a power servo booster including a shell, a power piston reciprocally movable within the shell, a diaphragm having an inner surface secured to the power piston and an outer surface secured to the shell, said diaphragm dividing an interior of said shell into a negative pressure chamber and an atmospheric pressure chamber, and said diaphragm, during the non-operating state of said power piston, providing a thin folded portion extending from the outer peripheral end of said power piston toward the front portion of said shell and a contact portion continuous from said folded portion and contacting an inner surface of said shell, the improvement comprising: a thickened wall portion of increased thickness formed by a discontinuous increase in thickness relative to the thickness of the thin folded portion, and said thickened wall portion does not fold or bend and is provided at least at said contact portion and extending from a point adjacent to said thin folded portion to an outer end bead portion, and a portion of the diaphragm contacts said outer peripheral end of said power piston.

2. The improvement of claim 1, wherein said thickened wall portion of said diaphragm is of annular shape having a central axis in coincidence with the axis of the diaphragm.

3. The improvement of claim 1, wherein said thickened wall portion is intermittently provided along the circumferential direction of said diaphragm.

4. The improvement of claim 1, wherein said thickened wall portion has a rectangular cross section.

5. The improvement of claim 1, wherein said thickened wall portion has a trapezoid cross section having its rear end thicker than its front end.

6. The improvement of claim 1 further comprising a second thickened wall portion in contact with the rear face of said power piston, and wherein said second thickened wall portion is an intermediate surface separated from thickened wall portion by said thin folded portion.

* * * * *